United States Patent [19]

Hermach et al.

[11] E Patent Number: Re. 33,522

[45] Reissued Date of Patent: Jan. 22, 1991

[54] CONVERSION OF LETTERPRESS TO OFFSET PRINTING

[75] Inventors: Carl J. Hermach, Largo, Fla.; Duane H. Houy, Dallas, Tex.

[73] Assignee: Publishers Equipment Corporation, Dallas, Tex.

[21] Appl. No.: 264,164

[22] Filed: Oct. 28, 1988

Related U.S. Patent Documents

Reissue of:

[64] Patent No.: 4,768,436
Issued: Sep. 6, 1988
Appl. No.: 873,121
Filed: Jun. 11, 1986

U.S. Applications:

[60] Continuation of Ser. No. 685,225, Dec. 27, 1984, abandoned, which is a continuation of Ser. No. 142,641, Apr. 22, 1980, abandoned, which is a division of Ser. No. 32,240, Apr. 20, 1979, abandoned.

[51] Int. Cl.[5] ..... B41F 7/02; B41F 13/28

[52] U.S. Cl. ..... 101/143; 101/177; 101/179; 101/220

[58] Field of Search ..... 101/178-185, 101/219-225, 177, 228, 137-140, 142-144, 217, 218

[56] References Cited

U.S. PATENT DOCUMENTS

| | | | |
|---|---|---|---|
| 2,118,965 | 5/1938 | Buttner | 101/247 |
| 2,216,562 | 10/1940 | Barber | 101/220 |
| 3,072,050 | 1/1963 | Wolff | 101/180 X |
| 3,470,816 | 10/1969 | Piecha et al. | 101/220 |
| 3,616,751 | 11/1971 | Mowry | 101/220 |
| 3,986,454 | 10/1976 | Grancer | 101/177 |

*Primary Examiner*—J. Reed Fisher
*Attorney, Agent, or Firm*—Kinzer, Plyer, Dorn, McEachran & Jambor

[57] ABSTRACT

A method and apparatus for conversion of a web fed letterpress unit (10) into a web fed offset printing press unit (42) having a main frame (12) an auxiliary frame (44) inside the main frame for receiving cylinders, a pair of offset plate cylinders (46 and 46a) for mounting printing plates thereon, an inking arrangement (16, 18 and 20) for applying films of ink to the plates, and a pair of blanket cylinders 48 and 48a) in close proximity of a position for respective rolling contact with the plates on the plate cylinder and the other blanket cylinder. An offset press gear train (114) is installed outside the frames if the shafts for the cylinders can be extended through the bores (56, 56a, 58, 58a, 76 and 112) in the main frame left from the removed letterpress unit cylinders. Otherwise the gear train (54) is placed inside the main frame. Pilots (60, 60a, 62 and 62a) for insertion into bores in the main frame guide the installation of the auxiliary frame. Eccentric bearings (68) are installed for bodily swinging cylinders between alternative positions.

8 Claims, 4 Drawing Sheets

CONVERSION OF LETTERPRESS TO OFFSET PRINTING

Matter enclosed in heavy brackets [ ] appears in the original patent but forms no part of this reissue specification; matter printed in italics indicates the additions made by reissue.

This is a *reissue of U.S. Pat. No. 4,768,436, which patent issued Sept. 6, 1988 on application Ser. No. 873,121, filed June 11, 1986, which is a* continuation of application Ser. No. 685,225, filed Dec. 27, 1984, which is a continuation of application Ser. No. 142,641, filed Apr. 22, 1980, which is a divisional application of application Ser. No. 32,240, *filed Apr. 20, 1979, the last three* [all] of which are now abandoned.

1. Technical Field

The present invention relates generally to printing presses, and in one of its aspects, to a method and apparatus for converting a web fed letterpress unit into a web fed offset printing press unit.

The news publishing industry has billions of dollars worth of letterpress equipment in the United States. The newspaper industry has, however, been switching from letterpress to offset printing for numerous reasons including improved quality of the print and lowered operating cost. At present, publishers have had little option other than to purchase new offset equipment to replace their letterpress equipment.

The frames for the letterpress units are massive and reboring the frames in place for insertion of offset cylinders is impractical. Often reboring is impossible because the new bores would overlap the old bores. Moreover, completely replacing the equipment of completely reworking it is very time consuming.

2. Background Art

As far as the inventor knows, there is no background art for conversion of letterpress units to offset printing units. A conversion known as direct lithographic or "di-litho" simply replaces the letterpress plate and impression cylinders with offset plate and blanket cylinders. In the di-litho process, the web is fed between the di-litho plate and blanket cylinders so that the process is not a true offset printing process.

DISCLOSURE OF INVENTION

In accordance with the present invention, a method for converting a web fed letterpress unit having a main frame, a pair of plate cylinders laterally spaced in the frame for mounting printing plates thereon, means for applying films of ink to the plates, and a pair of impression cylinders in respective rolling contact with the plates on the plate cylinder, into a web fed offset printing press unit includes removing the pair of letterpress plate cylinders and the pair of letterpress impression cylinders. A lower portion of an auxiliary frame for receiving offset cylinders in an offset printing press configuration is put inside the main frame. A pair of offset plate cylinders is then installed. The offset plate cylinders might fit into the bores and bearings for the letterpress plate cylinders in which case they can be installed directly, otherwise one or both of the offset plate cylinders is installed in the auxiliary frame. The lower portion of the auxiliary frame is then installed, using pilots to guide the installation of the auxiliary frame. The pilots, in one embodiment, are affixed to the auxiliary frame and are designed to be inserted into the unused cylinder bores of the main frame. After the auxiliary frame is installed, a pair of blanket cylinders is installed in close proximity to a position for respective rolling contact with the plates on the plate cylinder and the other blanket cylinder. In some circumstances the auxiliary frame is completely installed prior to the installation of the plate cylinders.

It is common for letterpress units to also have a pair of laterally spaced form rollers in respective rolling contact with the plates on the plate cylinder. A preferred conversion according to the present method includes removing the at least one pair of form rollers, and mounting micrometric adjusting sockets for receiving the form rollers for respective rolling contact between the at least one pair of form rollers with the plates of the plate cylinder after the pair of offset plate cylinders is installed. It is also preferred to plate the ink drums with copper, and add dampener motions which can be added to one of the form rollers.

The gear train used to drive the letterpress unit cylinders is not suitable for driving the offset cylinders. A new offset gear train must, therefore, be installed for imparting motion from one of the offset press unit cylinders to other offset press unit cylinders. Some of the gears for the letterpress unit can be removed, but many will still be used for driving at least one of the cylinders and for driving the inking drums. In converting some letterpress units, it will be possible to extend the shaft of the offset cylinders through the bores of the letterpress unit cylinders in the main frame by removing the bearings for the letterpress cylinders. In such a case, the offset gear train can normally be installed on the outside of the main frame to allow more room inside the frames for wider web widths. Otherwise, the offset gear train can be installed inside of the main frame.

Considering the cylinders to include both the drum body and the shaft, it is frequently necessary to make the drum bodies for the offset press shorter than the drum bodies were for the letterpress in order to allow additional room for the auxiliary frame and the offset gear train when it is inside the main frame. This shortening of the drum bodies narrows the allowable web width, but this normally does not present a problem since the industry has fairly well settled on a 58 inch web width which is sufficiently narrower than the typical 68 inch web width for which most letterpress units were designed. The total length of the cylinders is also shorter when the shafts cannot extend through the main frame bores for the letterpress cylinders.

A preferred conversion according to the present method and apparatus includes the installation of means for bodily swinging various cylinders into different positions for different printing arrangements and for throw-off in case of web wrap, for changing plates, or other cylinder maintenance.

A special method according to the present invention for converting a letterpress unit that has at least a half deck with a deck plate cylinder and a deck impression cylinder is to remove the deck impression cylinder, install a deck blanket cylinder in a position for rolling contact with the plates of the deck plate cylinder, if necessary replacing the deck plate cylinder with a deck offset plate cylinder, and installing an impression cylinder in the vicinity of the cusp formed by the pair of blanket cylinders for placing in rolling contact with the deck blanket cylinder and for placing in rolling contact with all three cylinders, the deck blanket cylinder and the pair of offset blanket cylinders. This method also includes the situation where there is a full deck, the full deck being simply two half decks.

In a conversion involving at least one half deck, a means is installed for bodily swinging each of the blanket cylinders and the impression cylinder between a first position in which the blanket cylinders make contact with the plates of their respective plate cylinders and with the impression cylinder, a second position in which the pair of blanket cylinders make contact with each other and are isolated from the impression cylinder, and the deck blanket cylinder makes contact with the impression cylinder, and a third position in which the blanket cylinders and the impression cylinder are displaced into a throw-off position in which the blanket cylinders are isolated from their associated cylinders. Such a method can also include installing a means for bodily swinging the remaining offset cylinders wherein all offset cylinders are displaced in the third portion.

These and other objects, advantages and features of this invention will be apparent from the following description taken with reference to the accompanying drawings, wherein is shown the preferred embodiments of the invention.

BEST MODE FOR CARRYING OUT THE INVENTION

Figure 1:
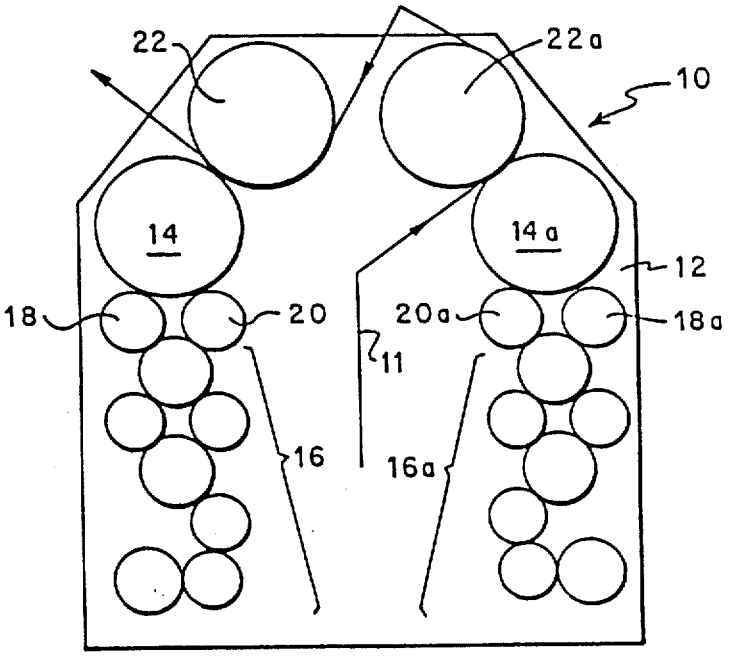
FIG. 1 is a diagramatic cross-sectional view taken from one end of a web fed letterpress unit.

Referring now to the drawing, and in particular to FIG. 1, a typical web fed letterpress unit, referred to generally by reference numeral 10 prints on both sides of a web 11. Letterpress unit 10 includes a main frame 12, a pair of plate cylinders 14 and 14a laterally spaced in frame 12 for mounting printing plates thereon, means including ink transfer rollers and cylinders or drums 16 and 16a and form rollers 18, 18a, 20 and 20a for applying films of ink to the plates. Letterpress unit 10 also includes a pair of impression cylinders 22 and 22a in respective rolling contact with the plates on the plate cylinder 14 and 14a, respectively.

Figure 2:
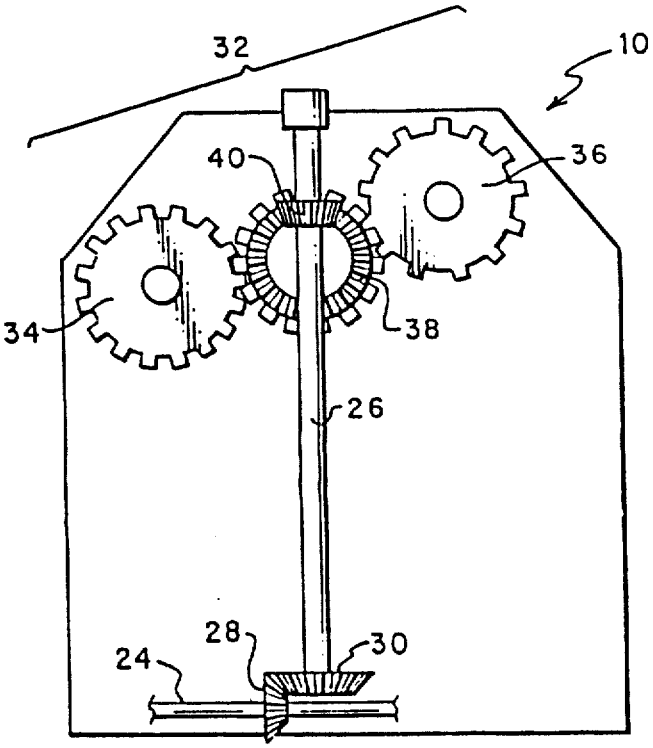
FIG. 2 is a diagramatic end view of the letterpress unit of FIG. 1.

Referring also to FIG. 2, the letterpress unit is driven by a horizontal shaft 24 which drives a vertical drive shaft 26 through bevel gears 28 and 30. Vertical drive shaft 26 in turn drives the letterpress cylinders through gear train 32 which includes a spur drive gear 34 for cylinder 14, a spur drive gear 36 for compression cylinder 22a and a spur gear-bevel gear combination 38 driven by vertical shaft 26 through bevel gear 40. On the far end of frame 32 are mounted spur gears corresponding to each of the plate cylinders 14 and 14a and each of the impression cylinders 22 and 22a so that the gear for plate cylinder 14 drives the gear for impression cylinder 22, and the gear for impression cylinder 22a drives the gear for plate cylinder 14a.

Figure 3:
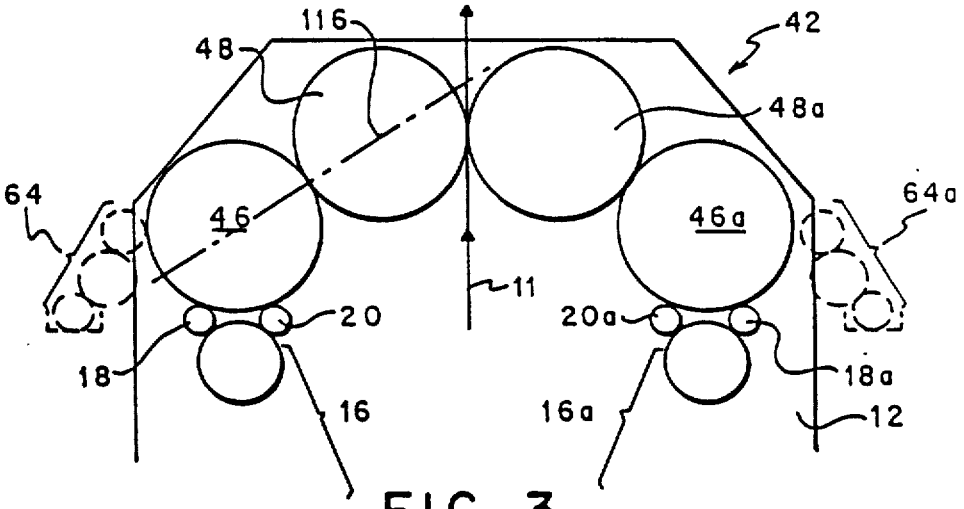
FIG. 3 is a diagramatic sectional view similar to that of FIG. 1 of the press of FIG. 1 after it has been converted to a web fed offset printing press unit.
Figure 4:
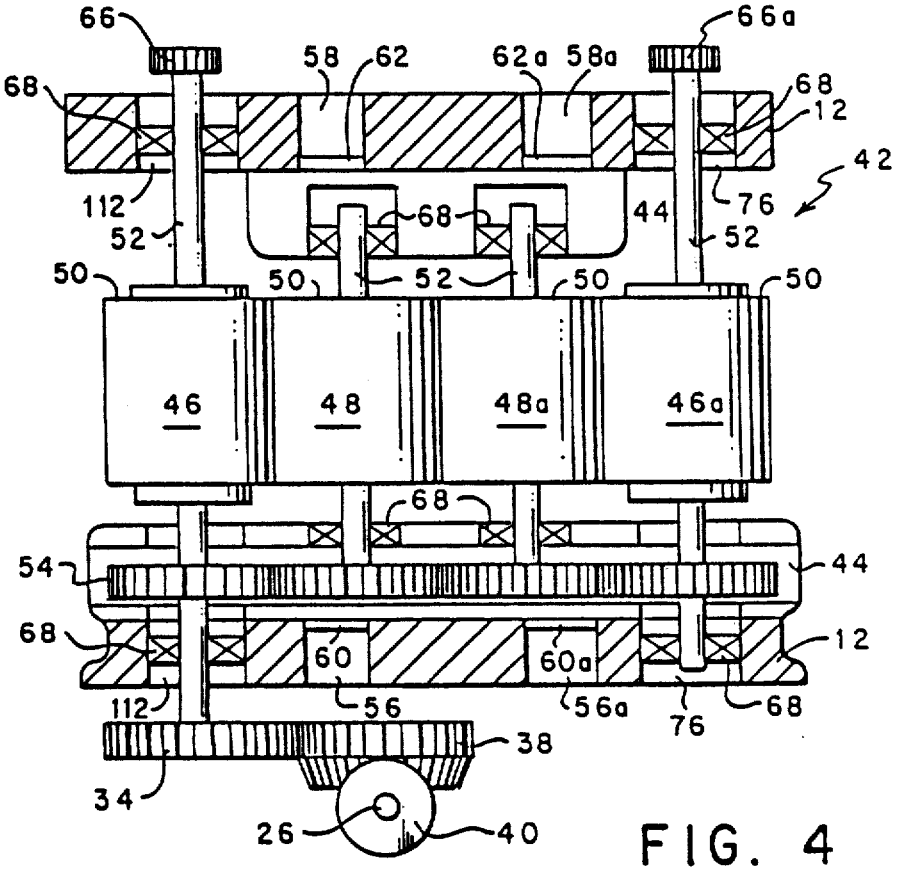
FIG. 4 is a top view of the offset printing press unit of FIG. 3 partly in section to show the bores in the press main frame.

Referring now to FIGS. 3 and 4, web fed offset printing press unit converted from web fed letterpress unit 10 of FIGS. 1 and 2 is referred to generally by reference numeral 42. It includes main frame 12, ink transfer rollers and drums 16 and 16a, and form rollers 18, 18a, 20 and 20a. It also includes the same driving mechanism through vertical shaft 26, bevel gear 40, combination spur gear-bevel gear 38 and spur gear 34. Offset press unit 42, however, also has an auxiliary frame 44 inside main frame 12 for receiving cylinders. A pair of offset plate cylinders 46 and 46a are laterally spaced inside the frames for mounting printing plates thereon, and a pair of blanket cylinders 48 and 48a are inside the frames in close proximity to a position for respective rolling contact with the plates on the plate cylinder, cylinder 46 or 46a, and the other blanket cylinder Considering cylinder 46 to include a drum 50 and a shaft 52, it can be seen that the shaft for some cylinders extends beyond auxiliary frame 44 and even beyond main frame 12. The cylinders are thus "inside the frames" in the sense that they are primarily inside the frames.

Web fed offset printing press unit 42 also includes a gear train 54 inside main frame 12 for imparting motion from one of the cylinders, cylinder 46 in this case, to other cylinders, in this case cylinders 48, 48a and 46a. It was necessary to shorten drums 50 of the cylinders in order to allow more room within main frame 12 for both auxiliary frame 44 and gear train 54. Gear train 54 could not be moved outside of main frame 12 since the shafts 52 of cylinders 48 and 48a do not align with bores 56, 56a, 58 and 58a for the letterpress unit cylinders even with the bearings removed from those bores.

A method for converting web fed letterpress unit 10 of FIGS. 1 and 2 into web fed offset printing press unit 42 of FIGS. 3 and 4 comprises in combination the steps of removing the pair of letterpress plate cylinders 14 and 14a and the pair of letterpress impression cylinders 22 and 22a, putting inside main frame 12 a lower portion of an auxiliary frame 44 for receiving offset cylinders in an offset printing press configuration, installing a pair of offset plate cylinders 46 and 46a, installing the lower portion of auxiliary frame 44, and installing a pair of blanket cylinders 48 and 48a in close proximity to a position for respective rolling contact with the plates on plate cylinder 46 and 46a respectively and the other blanket cylinder.

A method according to the present invention where auxiliary frame 44 also includes a pilot, in this case four pilots 60, 60a, 62 and 62a, for insertion into a bore, bores 56, 56a, 58 and 58a respectively, for one of the letterpress cylinders can also include positioning auxiliary frame 44 on the inside of main frame 12 after the pair of letterpress plate cylinders 46 and 46a and pair of letterpress impression cylinders 22 and 22a have been removed to make the pilot align with the associated bore, and then moving auxiliary frame 44 to insert the pilot into the bore.

A preferred method includes removing at least one pair of form rollers, either 18 and 18a or 20 and 20a or both pairs, mounting micrometric adjusting sockets for receiving the form rollers for respective rolling contact by the form rollers with the plates of plate cylinders 46 and 46a after the pair of offset plate cylinders is installed, and then installing the at least one pair of form rollers. It is also preferred that the ink drums of 16 and 16a be plated with copper, and that dampener motions 64 and 64a be added to one of the form rollers. Gear train 54 is also added. Gears 66 and 66a are added to plate cylinders 46 and 46a respectively for driving the inking rollers and drums. Means 68 for bodily swinging each of blanket cylinders 48 and 48a is installed. Means 68 is for bodily swinging the cylinders between a first position in which the blanket cylinders make contact with their respective plate cylinders and with each other for applying an inked image on opposite sides of a web fed between them, and a second position in which the blanket cylinders are displaced into a throw-off position in which the blanket cylinders are isolated from their associated cylinders. Means 68 can be manually or hydraulically turned eccentric bearings. Such mechanisms are common in printing presses and are described in detail in U.S. Pat. No. 3,329,086, issued to Pullen. Means 68 are also installed for bodily swinging each of the plate cylinders, and the positions mentioned can be accomplished by bodily swinging both plate cylinders and blanket cylinders.

Figure 5:
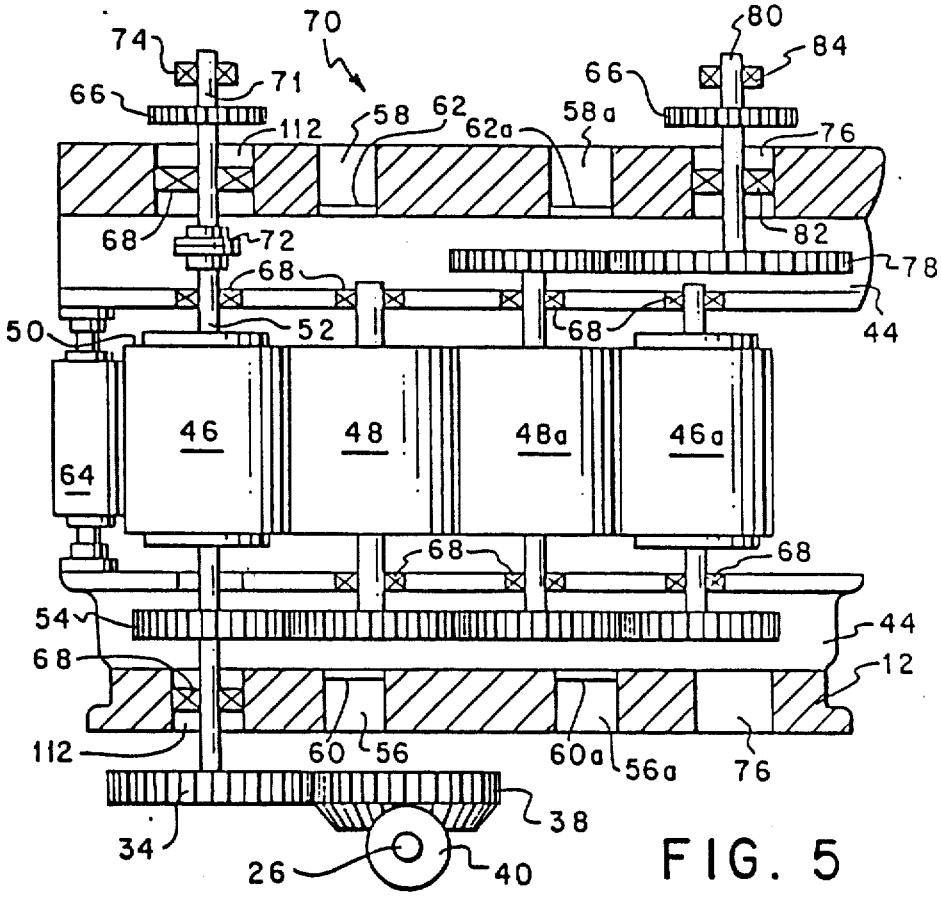
FIG. 5 is a top view similar to that of FIG. 4 for an offset press unit converted from a different letterpress unit.

Referring now to FIG. 5, an offset press unit converted from a different letterpress unit is referred to generally by reference numeral 70, but elements similar to those in offset press unit 42 are numbered the same as in FIGS. 3 and 4. An extension 71 of shaft 52 is added for cylinder 46 by means of coupler 42. An additional means 68 for bodily swinging plate cylinder 46 is added along with an additional bearing 74 in order to support both ends of shaft 52 and extension 71, thus structurally relieving coupler 72. Since the shaft of plate cylinder 46a no longer aligns with the letterpress plate cylinder bore 76, a gear train 78 is used to impart motion from blanket cylinder 48a to shaft 80 which extends through bore 76 and is supported by bearings 82 and 84. Extra means 68 for bodily swinging plate cylinder 46a are installed in auxiliary frame 44 since the journal for the shaft of plate cylinder 46a must now be in the auxiliary frame rather than in main frame 12.

Figure 6:
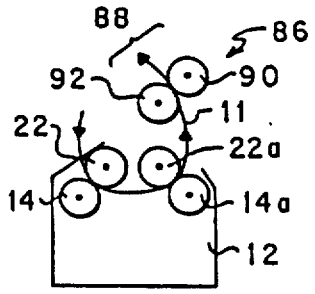
FIG. 6 is a diagramatic view similar to that of FIG. 1 for a three-color letterpress unit.
Figure 7:
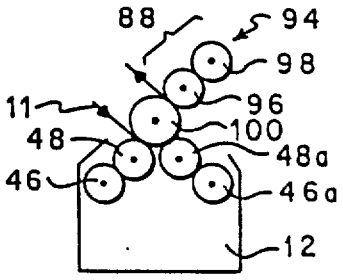
FIG. 7 is a diagramatic view similar to that of FIG. 3 for a three-color offset press converted from the three-color letterpress of FIG. 6.
Figure 8:
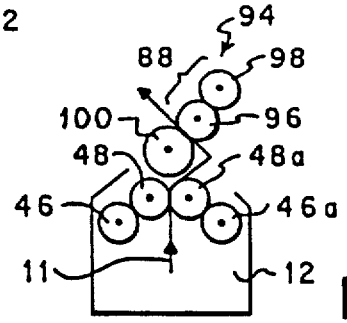
FIG. 8 is a diagramatic view similar to that of FIG. 3 for the offset press unit of FIG. 7 shown in a "spot color" configuration.

Referring now to FIG. 6, a three-color letterpress unit for printing three colors on one side of web 11 is referred to generally by reference numeral 86. Three-color letterpress unit 86 includes a half deck 88 which includes deck plate cylinder 90 and deck impression cylinder 92. Referring also to FIGS. 7 and 8, a method according to the present invention for converting to an offset press unit 94 includes removing the letterpress cylinders and adding offset press cylinders as before, including replacing impression cylinder 92 with deck blanket cylinder 96 and replacing deck letterpress plate cylinder 90 with deck offset plate cylinder 98. The method further includes installing an offset impression cylinder 100 along with the necessary auxiliary frame to support it, impression cylinder 100 being chosen for the proper size to be in rolling contact with blanket cylinders 48, 48a, and 96. If it is desired to dedicate three-color offset press unit 94 as a three-color unit, then no further changes are necessary, but a preferred method according to the present invention includes conversion of letterpress unit 86 into an offset press 94 which can be used for three color or spot color, where "spot color" refers to adding a single color to one side of a web that is printed on both sides. Referring in particular to FIG. 8, blanket cylinders 48 and 48a print on both sides of web 11 in what is known as "blanket-to-blanket" printing while blanket cylinder 96 is used to add an additional color to one side of web 11 in "blanket-to-impression" printing. By installing the cylinders in the auxiliary frame as already described and installing a means for bodily swinging each of the blanket cylinders and the impression cylinder, which can include a means for bodily swinging the remaining offset cylinders, between a first position in which blanket cylinders 48, 48a and 96 make contact with the plates of their respective plate cylinders 46, 46a and 98, and with impression cylinder 100, a second position in which the pair of blanket cylinders 48 and 48a make contact with each other and are isolated from impression cylinder 100, and deck blanket cylinder 96 makes contact with impression cylinder 100, and a third position in which blanket cylinders 48, 48a and 96, and impression cylinder 100 are displaced into a throw-off position in which the blanket cylinders are isolated from their associated cylinders. All offset cylinders could be displaced into the third position. One simple means for carrying out such an arrangement between the first two positions is to include means for bodily swinging blanket cylinders 48 and 48a and lifting the entire half deck 88 along with impression cylinder 100.

Figure 9:
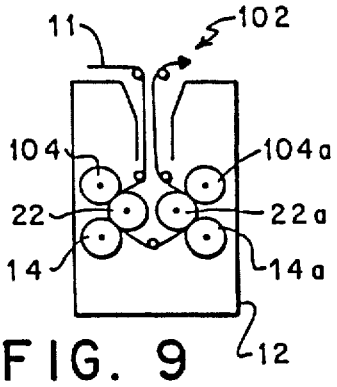
FIG. 9 is a diagramatic view similar to that of FIG. 1 for a double hump four-color unit.
Figure 10:
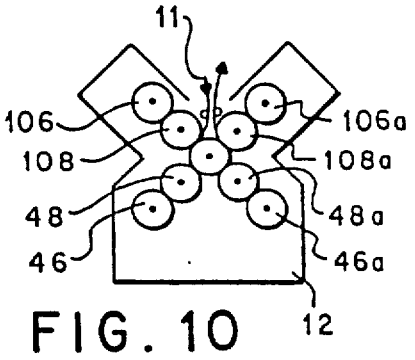
FIG. 10 is a diagramatic view similar to that of FIG. 3 for a four-color offset printing press unit converted from the double hump four-color letterpress unit of FIG. 9.

Referring now to FIG. 9, a four-color letterpress unit is referred to generally by reference numeral 102. Four-color letterpress unit 102 prints four colors on one side of web 11, one color being added by each plate cylinder 14, 14a 104 and 104a. Plate cylinders 104 and 104a are referred to as "humps". Hump plate cylinders 104 and 104a are on half decks. A method according to the present invention includes removing plate cylinders 104 and 104a from their respective half decks and replacing them by offset plate cylinders 106 and 106a respectively in conjunction with blanket cylinders 108 and 108a respectively. In addition, offset impression cylinder 110 is added between the four blanket cylinders for placing in rolling contact with the blanket cylinders.

Figure 11:
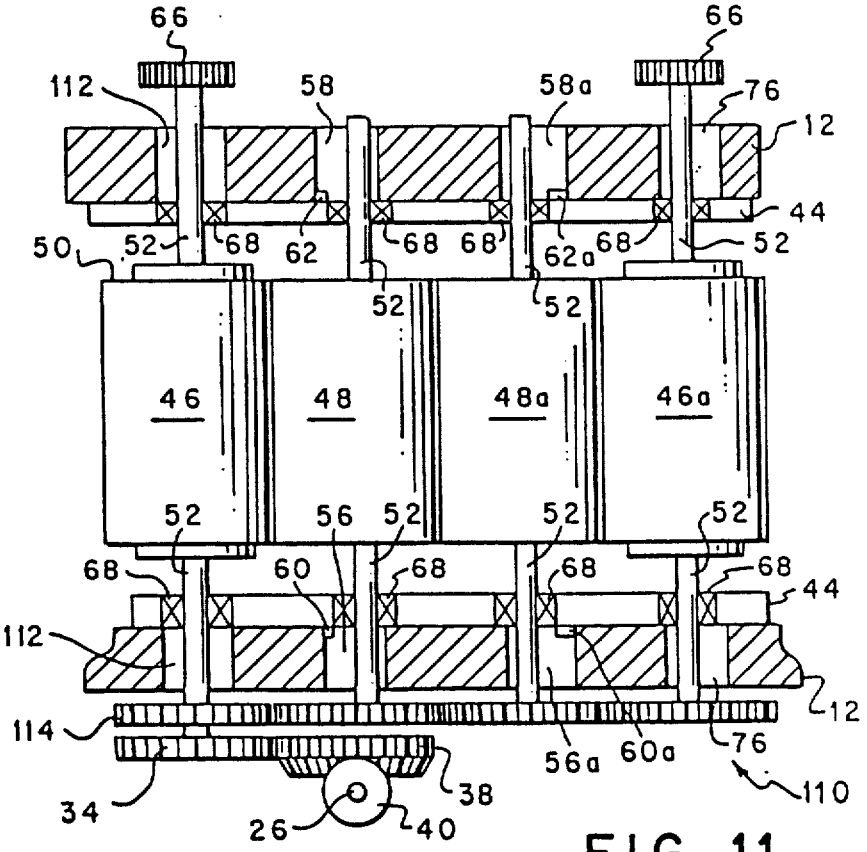
FIG. 11 is a top view similar to that of FIGS. 4 and 5 for a different offset press unit.

Referring now to FIG. 11, an alternative embodiment of an offset press converted from a letterpress is referred to generally be reference numeral 110. Shaft 52 to plate cylinder 46 aligns with bore 112, but means 68 for bodily swinging plate cylinder 46 is moved into auxiliary frame 44 although it could have remained in bore 112. To allow for a longer drum 50, and hence a wider web width, a gear train 114 is placed outside main frame 12 for imparting motion from one of the cylinders, plate cylinder 46, to other cylinders, in this case blanket cylinders 48 and 48a and plate cylinder 46a. The shafts of the cylinders extend through bores 56, 56a, 76 and 112 for the letterpress unit cylinders in main frame 12 and through the associated bearings, in this case means 68, to the outside of main frame 12. The gears of gear train 114 are fixed to shafts 52 of the cylinders. This arrangement was possible because for this particular conversion, the shafts of the offset press cylinders aligned with the bores of the letterpress cylinder. The bearings from the main frame bores were removed for the offset press configuration cylinder shafts which do not align with the bearings. In this case, the bearings for cylinder 46 were removed from the main frame even though they aligned. This method includes the situation in which some gears can be put outside main frame 12 but others must be put inside main frame 12 in order to get different print configurations.

Only a lower portion of auxiliary frame 44 has been discussed, and in some situations this may be the entire auxiliary frame. Referring again to FIG. 3, another embodiment of a lower portion of auxiliary frame 44 will leave the bores for the cylinders exposed so that the offset cylinders can simply be dropped into place. The location of the top of such a lower portion is illustrated by line 116. A cap is then attached to hold the cylinders and their respective bearings in place. This is similar to the common practice of capping main frames.

From the foregoing it will be seen that this invention is one well adapted to attain all of the ends and objects hereinabove set forth, together with other advantages which are obvious and which are inherent to the apparatus. It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

We claim:

1. An offset printing press unit comprising:

(a) a main frame including a pair of spaced apart walls defining first pairs of aligned cylindrical bearing receiving bores in spaced apart relation and second pairs of aligned cylindrical bearing receiving bores in spaced relation to each other and disposed intermediate said first pairs of aligned bores;

(b) cylinder receiving means at least a portion of which is intermediate said main frame walls including a first portion fixedly secured to one of said walls and a second portion fixedly secured to the other thereof, said cylinder receiving means being adapted to rotatably support at least one printing cylinder;

(c) a pair of plate cylinders at least one of which is rotatably supported within one of said first pairs of aligned bores in said main frame;

(d) a pair of blanket cylinders rotatably supported upon one of said main frame and cylinder receiving means, each in contact with the other and with one of said plate cylinders with at least one of said blanket cylinders rotatably supported upon said cylinder receiving means;

(e) the axes of rotation of said pair of blanket cylinders being spaced apart a distance less than the distance between *the axes of* said second pairs of aligned bores in said main frame.

2. As offset press unit as claimed in claim 1 wherein each said portion of said cylinder receiving means includes pilot means thereon adapted to engage at least one of said in said main frame, said pilot means being disposed therein.

3. An offset press unit as claimed in claim 1, a gear train operatively interconnecting said plate cylinders and blanket cylinders.

4. In an offset press unit as claimed in claim 1, wherein each said portion of said cylinder receiving means includes a lower portion for rotatably supporting said at least one of said blanket cylinders to permit installation and removal of said blanket cylinders.

5. In an offset press unit as claimed in claim 1 wherein said portions of said cylinder receiving means comprise an auxiliary frame disposed intermediate said spaced apart walls and said auxiliary frame is adapted to rotatably receive both said blanket cylinders, said blanket cylinders being rotatably supported upon said auxiliary frame intermediate said main frame walls.

6. In an offset press unit as claimed in claim 5 wherein said first and second portions of said auxiliary frame include pilots disposed in said second pairs of aligned bores.

7. An offset printing press unit as claimed in claim 1 wherein said cylinder receiving means rotatably supports both said blanket cylinders.

8. An offset printing press unit as claimed in claim 7 wherein said cylinder receiving means include pilots disposed within said second pairs of aligned bores.

* * * * *